United States Patent [19]
Azuma

[11] Patent Number: 4,477,978
[45] Date of Patent: Oct. 23, 1984

[54] DIMENSION MEASURING APPARATUS

[75] Inventor: Kazuo Azuma, Toyota, Japan

[73] Assignee: Toyota Jidosha Kabushiki Kaisha, Toyota, Japan

[21] Appl. No.: 473,610

[22] Filed: Mar. 9, 1983

[30] Foreign Application Priority Data

Oct. 1, 1982 [JP] Japan ............... 57-150025

[51] Int. Cl.³ .................. G01B 7/00; G01B 7/31
[52] U.S. Cl. .................. 33/180 AT; 33/1 M; 33/288; 33/169 C
[58] Field of Search ......... 33/1 M, 172 E, 174 L, 33/179.5 D, 180 AT, 288, 169 C; 269/25, 216

[56] References Cited

U.S. PATENT DOCUMENTS

| | | | |
|---|---|---|---|
| 2,747,535 | 5/1956 | Curry | 269/25 |
| 3,241,243 | 3/1966 | Speer | 33/1 M |
| 3,455,025 | 7/1969 | Heyroth | 33/1 M |
| 3,888,012 | 6/1975 | Droz | 33/174 L |

FOREIGN PATENT DOCUMENTS

| | | | |
|---|---|---|---|
| 9145 | 1/1978 | Japan | 33/1 M |
| 644638 | 1/1979 | U.S.S.R. | 33/1 M |

Primary Examiner—Willis Little
Attorney, Agent, or Firm—Kenyon & Kenyon

[57] ABSTRACT

A dimension measuring apparatus, for automatically measuring a dimension of a workpiece as the workpiece is on a production line, has a probe with a tapered end for insertion into a hole of the workpiece to be measured. The probe is supported by a second movable base provided on a first movable base. The first movable base is slidably provided on a frame member in one direction in a planar level and the second movable base is slidably provided on a grooved upper surface of the first movable base in another direction perpendicular to the one direction in the planar level. The movement value of the probe is detected by means of detecting the movement values of the first and second movable bases through potentiometers.

9 Claims, 8 Drawing Figures

DIMENSION MEASURING APPARATUS

BACKGROUND OF THE INVENTION

1. Field of the Invention

This invention relates to a dimension measuring apparatus capable of digitally measuring dimensions of a workpiece to be measured, and more particularly to a dimension measuring apparatus suitable for measuring a body of a motor vehicle and the like.

2. Description of the Prior Art

The accuracy in assembling an engine compartment of a motor vehicle constitutes an important factor for determining the quality of a body of a motor vehicle. However, heretofore, it has been almost impossible to instantaneously measure the accuracy of the individual vehicle bodies successively flowing on a welding-assembling line for the production of the vehicle bodies, and consequently, the individual vehicle bodies have been taken out of the production line so as to measure the accuracy in assembling. Because of this, it has been necessary to restrict the processing capacity of the production line, and a multiplicity of numbers of man-hours have been required for obtaining the samples for the measurement in order to merely inspect deflections in dimensions for the purpose of statistics. In consequence, difficulties are felt in improving the production capacity, and moreover, the routine quality control on the production line cannot be satisfactorily performed.

SUMMARY OF THE INVENTION

The present invention has been developed to obviate the above-described disadvantages of the prior art and has as its object the provision of a dimension measuring apparatus capable of readily and quickly obtaining the accuracy in dimensions of a workpiece to be measured.

The present invention is of such an arrangement that movable bases are slidably provided on a frame member, a probe with a tapered end supported by the movable bases is inserted in a hole formed in a workpiece to be measured, and movement values of the probe are detected through a detector, so that dimensions of the workpiece to be measured can be readily and quickly measured.

DETAILED DESCRIPTION OF THE PREFERRED EMBODIMENT

Detailed description will hereunder be give of a preferred embodiment of the dimension measuring apparatus according to the present invention with reference to the accompanying drawings.

Figure 1:
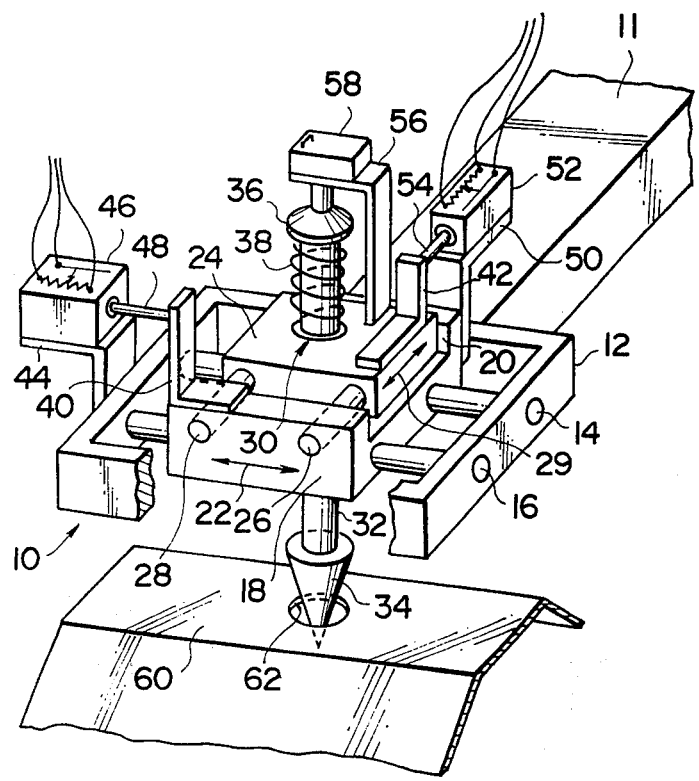
FIG. 1 is a perspective view showing an embodiment of the measuring sensor of the dimension measuring apparatus according to the invention.

FIG. 1 is a perspective view of an embodiment of the dimension measuring apparatus according to the invention.

Referring to FIG. 1, a frame member 12 is affixed to the forward end of an arm 11 of a measuring sensor 10 connected to a driving device, not shown. Rods 14 and 16 are spanned across and affixed to a pair of opposing sides of the frame member 12. These rods 14 and 16 extend through a first movable base 18 disposed within the frame member 12.

The first movable base 18 is formed at the top end face thereof with a groove portion 20, and is slidable along the rods 14 and 16 as indicated by a double-headed arrow 22. A second movable base 24 is disposed in the groove portion 20 of the first movable base 18. Rods 26 and 28 spanning the groove portion 20 extend through this second movable base 24 which is slidable along the rods 26 and 28 as indicated by a double-headed arrow 29. In addition, the rods 14 and 16 lie in planes which perpendicularly intersect the rods 26 and 28, and a plane incorporating the axes of the rods 14 and 16 is parallel to a plane incorporating the axes of the rods 26 and 28.

A probe 30 extending through both the first and second movable bases 18 and 24 has a columnar portion 32 provided at one end thereof ( the bottom end portion in FIG. 1) with a tapered portion or end 34 and at the other end portion thereof with a disc 36. The probe 30 is biased downwardly by the resiliency of a spring 38 confined between the second movable base 24 and the disc 36.

Receiving portions 40 and 42 which are of substantially L-shape are affixed to the upper ends of the first and second movable bases 18 and 24, respectively. Abutted against the receiving portion 40 is a contact 48 of a linear potentiometer 46 affixed to the outer peripheral surface of the frame member 12 through an L-shaped bracket 44. Also, abutted against the receiving portion 42 is a contact 54 of a linear potentiometer 52 affixed to a side surface of the first movable base 18 through an L-shaped bracket 50. Further, provided upwardly of the probe 30 is a limit switch 58 fixed through an L-shaped bracket 56 provided on the upper surface of the second movable base 24.

A large hole, not shown, is formed in the central portion of the first movable base 18, so that, when the second movable base 24 slides along the rods 26 and 28, the probe 30 slidably extending through the second movable base 24 can avoid interfering with the first movable base 18. With this arrangement, the probe 30 effects two dimensional movements within a preset range including the movement of the first movable base 18 along the rods 14 and 16 and the movement of the second movable base 24 along the rods 26 and 28. The movement values of the probe 30 can be detected by a computer, not shown, through the linear potentiometers 46 and 52. Reference numeral 60 shown in FIG. 1 indicates a surface to be measured of the workpiece, in which a reference hole 62 is formed.

Description will hereunder be given of operation of the dimension measuring apparatus of the embodiment having the above-described arrangement, which is applied to the measurements of dimensions of a vehicle body.

Figure 2:
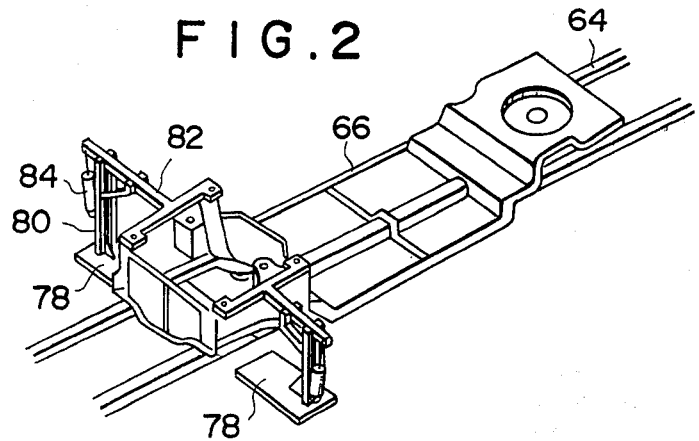
FIG. 2 is a perspective view showing an underbody of a motor vehicle disposed on a production line.
Figure 3:
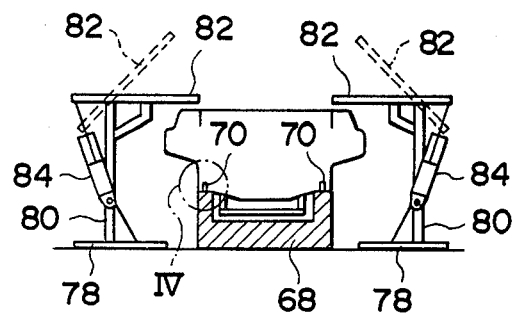
FIG. 3 is a view showing the underbody of the motor vehicle disposed on a jig.
Figure 4:
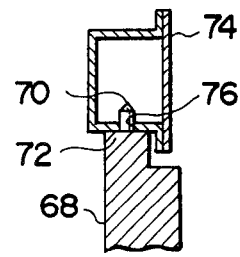
FIG. 4 is an enlarged view showing a portion IV in FIG. 3.

As shown in FIG. 2, a transferring apparatus 64 has thereon an underbody 66 and carries the same on a line where the dimension measuring apparatus is installed. As shown in FIGS. 2 and 3, the transferring apparatus 64 lowers the underbody 66 onto a jig 68 so that a work-set reference hole formed in the lower portion of a frontside member of the underbody 66 meets with a reference pin 70 formed in the jig 68. The coupled state between this reference pin 70 and the work-set reference hole 76 is shown in FIG. 4. The jig 68 is formed with a projection 72, on the top of which the reference pin 70 is provided. The reference pin 70 is inserted into the work-set reference hole 76 formed at the bottom end of the frontside member 74.

As shown in FIGS. 2 and 3, supports 80 are affixed onto base boards 78 at the opposite sides of the jig 68. Arms 82 are rotatably provided on the top ends of these supports 80, respectively, and air cylinders 84 for turning the arms 82 are provided at the intermediate portions of the supports 80, respectively. As shown in FIG. 2, the forward end portions of the arms 82 are formed into a U-shape, respectively, at the forward end portion of which the measuring sensor 10 of the dimension measuring apparatus shown in FIG. 1 is adapted to be placed.

Figure 5:
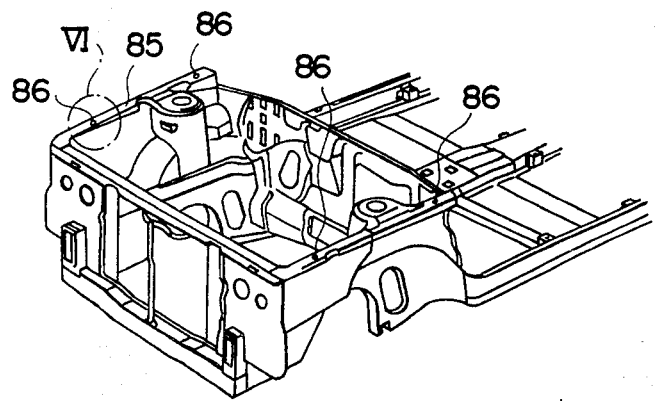
FIG. 5 is a perspective view showing the engine compartment.
Figure 6:
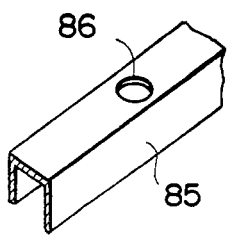
FIG. 6 is an enlarged view showing a portion VI in FIG. 5.

When the underbody 66 is positioned on the jig 68 by means of the transferring apparatus 64 as shown in FIG. 3, a limit switch, not shown, senses the underbody 66 and a control device, not shown, turns the arms 82 through the air cylinders 84 from a position indicated by dotted lines to a position indicated by solid lines. At this time, the measuring sensors 10 provided on the arms 82 are positioned upwardly of the reference holes 86 formed at the top end portion of an engine compartment 85 as shown in FIGS. 5 and 6.

Figure 7:
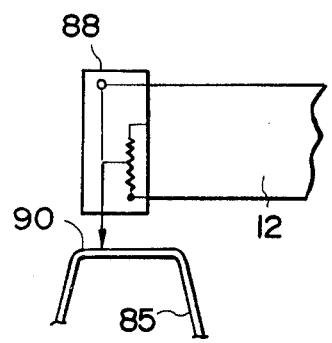
FIG. 7 is a view showing the conditions where the position of the surface to be measured is measured by means of the dimension measuring apparatus according to the present invention.

When the arms 82 are turned and the forward ends of the arms are lowered to predetermined positions, the contact of the linear potentiometer 88 provided on the undersurface of the frame member 12 comes into abutting contact with the upper surface 90 of the engine compartment 85 as shown in FIG. 7, whereby the contact is pushed into the main body of the linear potentiometer 88. The movement value of the contact of the linear potentiometer 88 is converted into a voltage and fed to a computer, not shown. The position of the upper surface 90 of the engine compartment 85, i.e., the height of the engine compartment 85 disposed on the jig 68 can be obtained from the movement value of the contact of the potentiometer 88.

On the other hand, the tapered portions 34 of the measuring sensors 10 are inserted into holes 86 to be measured formed in the engine compartment 85 similarly to the reference hole 62 shown in FIG. 1. By this arrangement, when the hole 86 to be measured is shifted from a predetermined position, part of the peripheral surface of the tapered portion 34 comes into contact with the hole 86, and the probe 30 is in turn moved accordingly. As a result, the first movable base 18 is imparted a force due to the movement of the probe 30 through the second movable base 24 and moves along the rods 14 and 16, while the second movable base 24 moves along the rods 26 and 28. Then, a movement value of the first movable base 18 is detected as a displacement value of the contact 48 of the linear potentiometer 46, and the displacement value of the contact 48 is converted into a quantity of electricity and fed to the computer, not shown. A movement value of the second movable base 24 is detected as a displacement value of the contact 54 of the potentiometer 52 similarly to the above, converted into a quantity of electricity and fed to the computer.

When the position of the hole 86 to be measured is shifted to a great extent so that the tapered portion 34 cannot be inserted into the hole 86, the tapered portion 34 abuts against the upper surface 90 as the arm 82 rotates, the probe 30 moves upwardly against the biasing force of the spring 38, and the disc 36 actuates the limit switch 58. An actuation signal of this limit switch 58 is fed to the computer indicating that the position of the reference hole cannot be measured in the same manner as from the aforesaid linear potentiometers.

Figure 8:
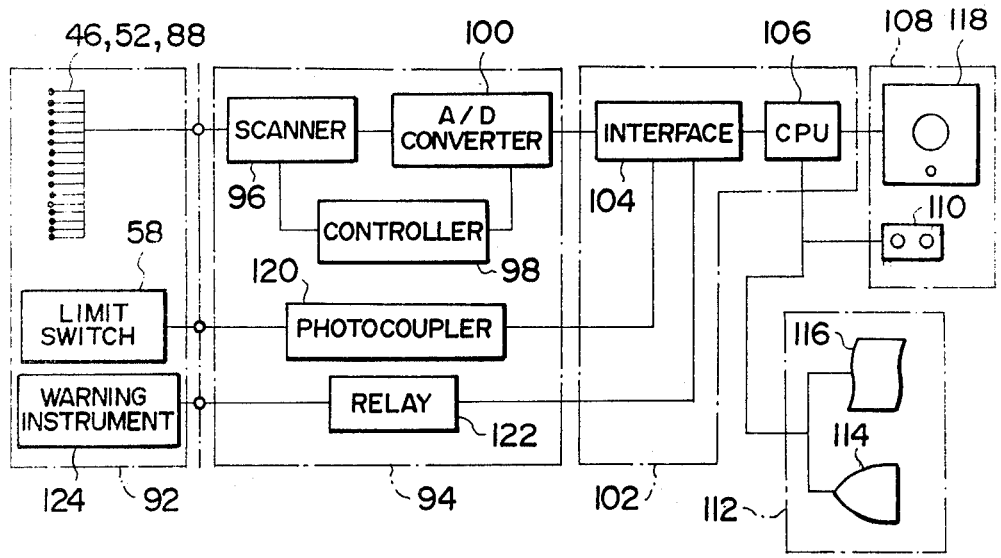
FIG. 8 is a view showing an example of a computer used in the dimension measuring apparatus according to the present invention.

FIG. 8 shows an example of the computer for processing signals from the linear potentiometers and the limit switch.

Detection signals from a plurality of linear potentiometers 46, 52, 88 and so on (In the present embodiment, there are used twelve linear potentiometers for measuring the positions of holes and surfaces at four positions.) of a component section 92 are fed to a scanner 96 of an input/output device 94. The respective detection signals of the linear potentiometers fed to the scanner 96 are controlled by a controller 98, and successively fed to an A/D converter 100 where analogue signals are converted into digital signals. The detection signals which have been converted into the digital signals, are fed to a CPU 106 through an interface 104.

Upon receiving the detection signals, the CPU 106 successively calls a reference voltage representing the condition where the reference hole 86 is formed at the reference position and previously stored in a tape cartridge 110 of an auxiliary memory 108. The detection signals are then compared with the reference voltage in accordance with a program stored in the tape cartridge 110 so as to process the data, and values of shifts from the reference position of the hole 86 detected by the actual measurements are outputted to a CRT 114 and a printer 116, of an indication section 112 and stored in a floppy disc 118 of the auxiliary memory 108.

When the positions of the holes 86 are shifted to a great extent, an actuation signal of the limit switch 58 is fed to the interface 104 from the component section 92 through a photocoupler 120 and inputted to the CPU 106. Upon receiving the actuation signal from the limit switch 58, the CPU 106 judges that it is impossible to measure the holes in accordance with the program stored in the tape cartridge 110, stores the measured data in the floppy disc 118, operates a relay 122 for converting a weak current signal to a heavy current signal through the interface 104, and emits a warning signal or the like to an external component 124.

As described above, all of the accuracies in assembling of the engine compartment constituting the important factors for determining the quality of vehicle body can be automatically and instantaneously measured on the welding-assembling line for the production of the vehicle body. In consequence, the processing capacity of the production line can be readily achieved and the routine quality control can be easily performed. Because of this, even a slight extraneous condition can be detected and the preventive control on the variability in quality can be achieved.

In the above-described embodiment, the measurement of the body of the motor vehicle has been described, however, the workpiece to be measured need not necessarily be limited to the body of the motor vehicle. Furthermore, in the above-described embodiment, description has been given of the case where the arm 82 rotates merely in the vertical direction in FIG. 3, however, it is possible to make the arm 82 to be driven tridimensionally. Further, the air cylinders have been described as being the devices for turning the arms 82, but, the air cylinders may be replaced by other driving devices.

As has been described hereinabove, according to the present invention, the tapered portion of the probe movable in a planar level and provided on the frame member is inserted into the hole of the workpiece to be measured, so that the dimensions of the workpiece to be measured can be readily measured from the movement values of the tapered portion of the probe.

What is claimed is:

1. Apparatus for measuring the deviation of an axis of a locating hole in a surface of a workpiece being fabricated on a production line from a preselcted position with respect to a datum position on the workpiece that is spaced from said locating hole, without removing the workpiece from the production line, the apparatus comprising
    a jig provided on the production line for registering with said datum point on the workpiece;
    means for supporting the workpiece in a fixed predetermined position relative to said jig when the jig is in registry with said datum point;
    a frame;
    means for supporting the frame for movement toward and away from a gaging position having a fixed predetermined relation to said jig;
    a probe having a longitudinal axis and an end portion centered on said axis and tapering from a diameter larger than said locating hole to an end substantially smaller than said locating hole;
    means for coupling the probe to said frame for movement with respect thereto in two dimensions defining a plane perpendicular to the longitudinal axis of the probe, said probe being mounted such that the longitudinal axis thereof is approximately parallel to a center axis of said locating hole when said frame is in said gaging position;
    means for resiliently urging the probe toward a first position with respect to the frame wherein the tapered end of the probe is extended from said coupling means; and
    means for sensing a distance moved by the longitudinal axis of the probe in each of said two dimensions from a reference axis corresponding to said preselected position of the axis of the locating hole when the frame is in the gaging position, said gaging position being predetermined such that the tapered end of the probe will fully seat in a properly positioned locating hole of a workpiece when the workpiece is supported with the datum point of the workpiece in registry with the jig.

2. Apparatus according to claim 1 wherein the means for coupling the probe to the frame comprises:
    a first movable base;
    means for mounting said first movable base on said frame for reciprocal translation in a first direction parallel to said plane;
    a second movable base; and
    means for mounting said second movable base on said first movable base for reciprocal translation in a second direction parallel to said plane and perpendicular to the first direction.

3. Apparatus according to claim 2 wherein the means for mounting said first movable base comprises:
    first rod means spanned across the frame member in said first direction, said first movable base being slidably mounted on said first rod means and having a grooved surface; and
    second rod means spanned across the grooved surface of the first movable base in said second direction, the second movable base being slidably mounted on said second rod means.

4. Apparatus according to claim 3, wherein the means for resiliently urging the probe toward a first position with respect to the frame comprises means for slidably supporting the probe on said second base for movement axially of said probe toward and away from said first position, and said first movable base has a clearance for allowing such axial movement of the probe.

5. Apparatus according to claim 4 wherein said means for resiliently urging the probe toward a first position with respect to the frame further comprises a spring acting between the second base and the probe, the spring biasing the probe so as to extend the tapered end from the second base toward said first position.

6. Apparatus according to claim 5, further comprising a limit switch mounted on the second base and responsive to axial movement of the probe by a predetermined amount away from said first position to provide a signal, said predetermined amount corresponding to a second position of the probe with respect to the frame wherein the tapered end of the probe is in contact with the surface of the workpiece adjacent to the locating hole when the frame is in the gaging position, whereby said signal indicates that the probe is not properly located in the hole.

7. Apparatus according to claim 2 wherein said means for sensing a distance moved by the longitudinal axis of the probe in each of said two dimensions comprises:
    a first potentiometer mounted on said frame member and having a movable member contacting the first movable base for measuring movement of said first movable base in said first direction and
    a second potentiometer mounted on the first movable base and having a movable member contacting the second movable base for measuring movement of said second movable base in said second direction.

8. Apparatus according to claim 7, further comprising a third potentiometer mounted on the frame and having a movable member adapted to contact said surface of a workpiece when the workpiece is positioned in said jig and the frame is in said gaging position for measuring displacement of said surface from a preselected reference position; and
    indicator means for receiving and processing measuring signals from said first, second, and third potentiometers for providing an indication of the deviation of said surface and said locating hole from said preselected reference location and reference axis, respectively.

9. Apparatus according to claim 1 wherein said means for supporting the frame for movement toward and away from a gaging position comprises an elongated arm having a free end, the frame being fixed to the free end of the arm;
    a stationary support located adjacent to the production line, the arm being pivotally connected to said stationary support at a location on said arm spaced from the free end thereof for rotation about said pivot location; and
    actuating means operatively connected between the arm and the stationary support for rotating the arm toward and away from said gaging position.

* * * * *